United States Patent
Song

(10) Patent No.: US 9,626,146 B2
(45) Date of Patent: Apr. 18, 2017

(54) ELECTRONIC APPARATUS, CONFIGURATION SETTING METHOD FOR ADJUSTING DISPLAY SIZE AND STORAGE MEDIUM

(71) Applicant: Kabushiki Kaisha Toshiba, Minato-ku, Tokyo (JP)

(72) Inventor: Kaiwen Kelvin Song, Hamura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 14/278,339

(22) Filed: May 15, 2014

(65) Prior Publication Data

US 2015/0029228 A1 Jan. 29, 2015

Related U.S. Application Data

(60) Provisional application No. 61/857,991, filed on Jul. 24, 2013.

(51) Int. Cl.
  *G06F 3/14* (2006.01)
  *G09G 5/30* (2006.01)
(52) U.S. Cl.
  CPC .......... *G06F 3/1454* (2013.01); *G09G 5/30* (2013.01); *G09G 2340/0442* (2013.01)
(58) Field of Classification Search
  None
  See application file for complete search history.

(56) References Cited

U.S. PATENT DOCUMENTS 7,180,531 B2 * 2/2007 Gery ...................... G06F 9/4443
  345/3.1
8,307,119 B2 * 11/2012 Rochelle ............... G06F 17/246
  709/201

(Continued)

FOREIGN PATENT DOCUMENTS

JP 2007-241342 A 9/2007
JP 2012-123825 A 6/2012

OTHER PUBLICATIONS

Steven Byle, Understanding Density Independence in Android, 2013, retrived from <<http://www.captechconsulting.com/blogs/understanding-density-independence-in-android>>, accessed Jan. 10, 2016.*

(Continued)

*Primary Examiner* — Michael J Cobb
(74) *Attorney, Agent, or Firm* — Knobbe, Martens, Olson & Bear LLP

(57) ABSTRACT

According to one embodiment, an electronic apparatus includes a first display, a hardware processor and an output module. The hardware processor is configured to calculate a parameter value based on a screen size of the first display, a resolution of the first display and a first setting value associated with a first display size of an object on the first display, the parameter value being used for calculating a second setting value associated with a display size of the object on a second display of a second electronic apparatus, the second setting value used to synchronize the display size of the object on the second display with the display size of the object on the first display, the first display and the second display being different in at least one of screen size and resolution from each other.

8 Claims, 3 Drawing Sheets

(56) References Cited

U.S. PATENT DOCUMENTS

| | | | | |
|---|---|---|---|---|
| 2008/0030425 | A1* | 2/2008 | Fullerton | G06F 3/1423 345/1.1 |
| 2008/0144051 | A1* | 6/2008 | Voltz | G06F 3/14 358/1.2 |
| 2009/0309808 | A1* | 12/2009 | Swingler | G06F 3/1423 345/1.3 |
| 2013/0063492 | A1* | 3/2013 | Washington | G09G 5/003 345/660 |
| 2013/0339833 | A1* | 12/2013 | Chen | G06F 17/211 715/220 |
| 2014/0118294 | A1* | 5/2014 | Yamada | G06F 3/0487 345/174 |
| 2014/0312125 | A1* | 10/2014 | Noumura | G06K 19/06028 235/494 |

OTHER PUBLICATIONS

Brian LePore, Device Independent Pixel Formula for Mobile Devices, 2012, retrived from <<https://www.brandbuilderwebsites.com/blog/2012/03/29/device-independent-pixel-formula-for-mobile-devices/>>, accessed Jan. 10, 2016.*

Tek Eye, What are DPI, DIP, DP, PPI, SP and Screen Resolutions in Android, 2013, retrived from <<http://tekeye.biz/2013/android-dpi-dip-dp-ppi-sp-and-screens>>, accessed Jan. 10, 2016.*

Apple, Resolution Independence Guidelines: Overview of Resolution Independence, 2007, retrived from <<http://developer.apple.com/library/mac/documentation/UserExperience/Conceptual/HiDPIOverview/HiDPIConcepts/HiDPIConce>>, accessed Jan. 11, 2016.*

* cited by examiner

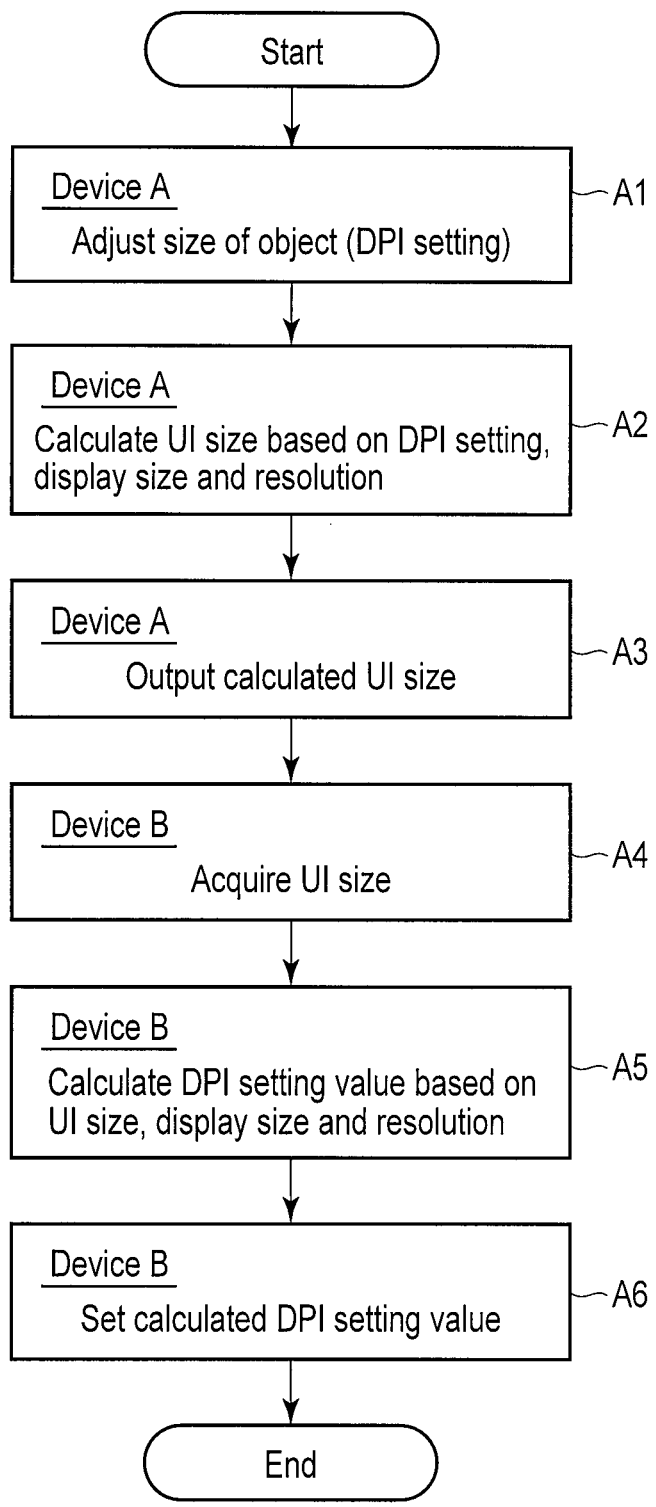
F I G. 3

ELECTRONIC APPARATUS, CONFIGURATION SETTING METHOD FOR ADJUSTING DISPLAY SIZE AND STORAGE MEDIUM

CROSS-REFERENCE TO RELATED APPLICATIONS

This application claims the benefit of U.S. Provisional Application No. 61/857,991, filed Jul. 24, 2013, the entire contents of which are incorporated herein by reference.

FIELD

Embodiments described herein relate generally to environment setting technology suitable for electronic apparatuses including displays.

BACKGROUND

In recent years, various types of electronic apparatuses such as a notebook PC (personal computer) and a tablet terminal are in use. Many of these apparatuses include an LCD (liquid crystal display) as a display. A user can set the sizes of objects such as characters and icons displayed on the LCD, arbitrarily. Such setting is called, for example, a DPI (dots per inch) setting.

In addition, recently, a user possesses a plurality of electronic apparatuses different in, for example, a screen size and resolution of the LCD, and often uses the electronic apparatuses in different ways depending on the situation. To maintain constant sizes of objects such as characters and icons displayed on the LCDs, the user needs to carry out the DPI setting for each of the electronic apparatuses in accordance with the screen size and resolution of the LCD of each apparatus.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary flowchart showing procedures of synchronizing the display sizes of objects on the screens of the electronic apparatuses according to the embodiment.

DETAILED DESCRIPTION

Various embodiments will be described hereinafter with reference to the accompanying drawings.

In general, according to one embodiment, an electronic apparatus includes a display, a first calculator and an output module. The first calculator is configured to calculate a parameter value for synchronizing a first display size of an object on the first display with a second display size of the object on a second display of a second electronic apparatus based on a first screen size of the first display, first resolution of the first display and a first setting value associated with the first display size of the object on the first display. The output module is configured to output the parameter value.

Figure 1:
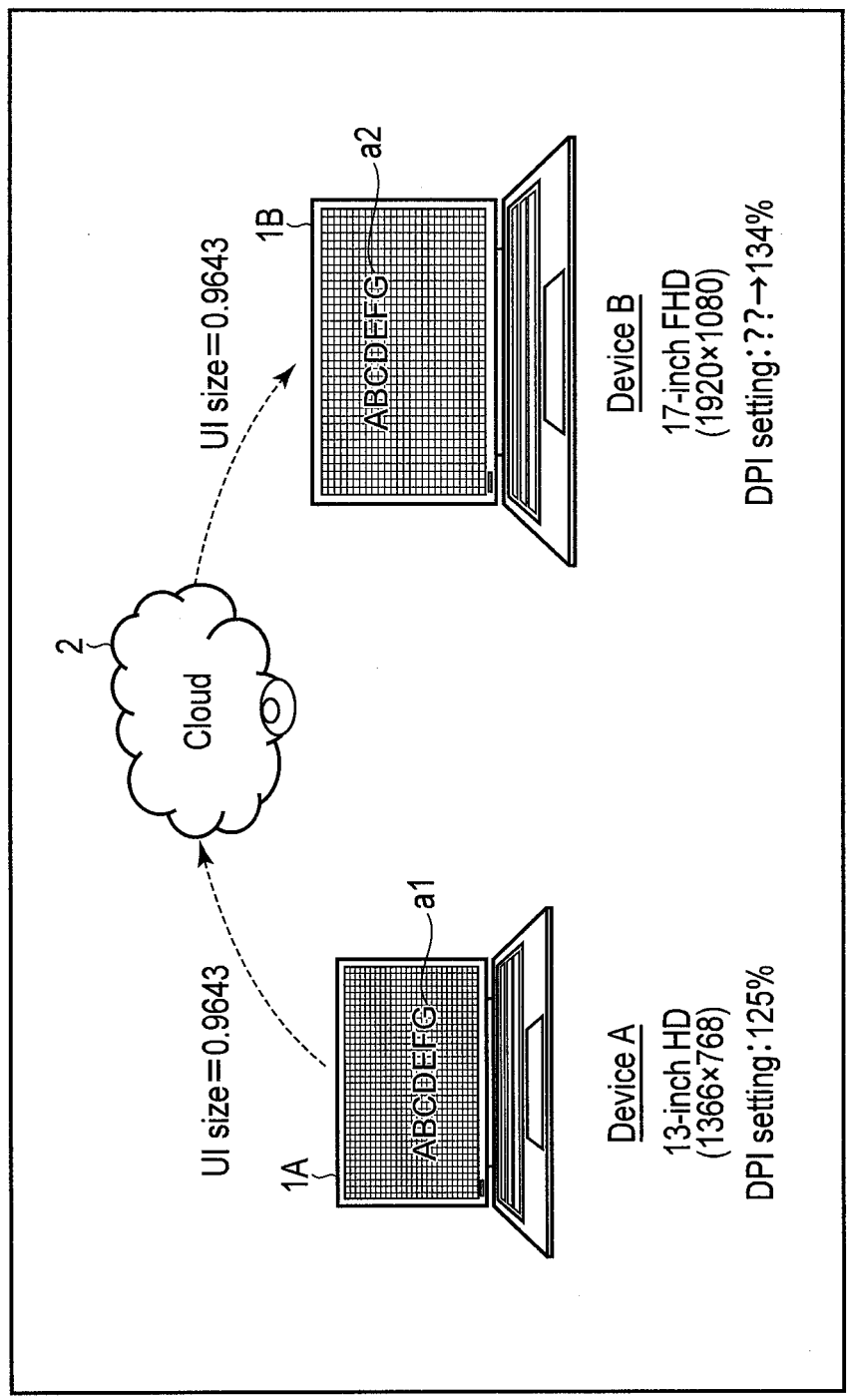
FIG. 1 is an exemplary illustration showing a mechanism for synchronizing display sizes of objects on screens of a plurality of electronic apparatuses according to an embodiment.

FIG. 1 is an exemplary illustration showing a mechanism for synchronizing the display sizes of objects on screens of electronic apparatuses 1A and 1B according to the present embodiment.

It is assumed that, for example, a user possessing the electronic apparatus 1A (device A) newly purchased the electronic apparatus 1B (device B). It is also assumed that an LCD provided on the electronic apparatus 1A has a screen size of 13 inches and a resolution of 1366 pixels×768 pixels (HD [high definition]) and that an LCD provided on the electronic apparatus 1B has a screen size of 17 inches and a resolution of 1920 pixels×1080 pixels (FHD [full high definition]). Furthermore, it is assumed that the user has set the electronic apparatus 1A such that the size of characters, icons, etc, displayed on the LCD of the electronic apparatus 1A, which the user already has possessed, is enlarged to 125%. The setting is called, for example, a DPI setting.

The user wishes to make the sizes of objects such as characters and icons (a2 in FIG. 1) displayed on the electronic apparatus 1B, which the user newly purchased, correspond to the sizes of objects such as characters and icons (a1 in FIG. 1) displayed on the electronic apparatus 1A, which the user already has possessed. In this case, the user essentially needs to carry out a DPI setting of the electronic apparatus 1B in accordance with the screen size and resolution of the LCD provided on the electronic apparatus 1B. That is, the DPI setting value of the electronic apparatus 1A (125%) cannot be applied as the DPI setting value of the electronic apparatus 1B, which differs from the electronic apparatus 1A in the screen size and resolution of the LCD, and thus the user needs to find the DPI setting value suitable for the electronic apparatus 1B by trial and error.

Thus, the electronic apparatuses 1A and 1B according to the present embodiment include a function to synchronize the display sizes of objects on the screens, and hereinafter, this point will be described in detail. Note that the electronic apparatuses 1A and 1B may be generically called electronic apparatus 1.

First, the electronic apparatus 1A calculates the parameter value for synchronizing the display sizes of objects on the screen from the screen size and the resolution of the LCD provided on the own apparatus and the DPI setting value set in the own apparatus. Here, the parameter value is called a UI (user interface) size. A method of calculating the UI size will be described later. The electronic apparatus 1A uploads the calculated UI size to, for example, a cloud account (server on the Internet [cloud 2]) of the user.

In contrast, the electronic apparatus 1B firstly downloads the UI size from the cloud 2. The electronic apparatus 1B calculates the DPI setting value to be set in the own apparatus from the screen size and the resolution of the LCD provided on the own apparatus and the UI size downloaded from the cloud 2. A method of calculating the DPI setting value will be described later. The electronic apparatus 1B executes the DPI setting of the own apparatus by using the calculated DPI setting value.

That is, the UI size is the parameter value for deriving the DPI setting value necessary for displaying objects in sizes desired by the user even on an LCD different in screen size and resolution, and the electronic apparatus 1 of the present embodiment includes a function to calculate the UI size and a function to calculate the DPI setting value from the UI size.

An example of transferring the UI size through the cloud 2 has been described, but the transfer is not limited to this. For example, the UI size may be directly transferred between parties (the electronic apparatuses 1A and 1B) by wireless communication over, for example, a WI-FI (registered trademark) network. The UI size also may be transferred by use of a storage medium such as a USB memory.

Figure 2:
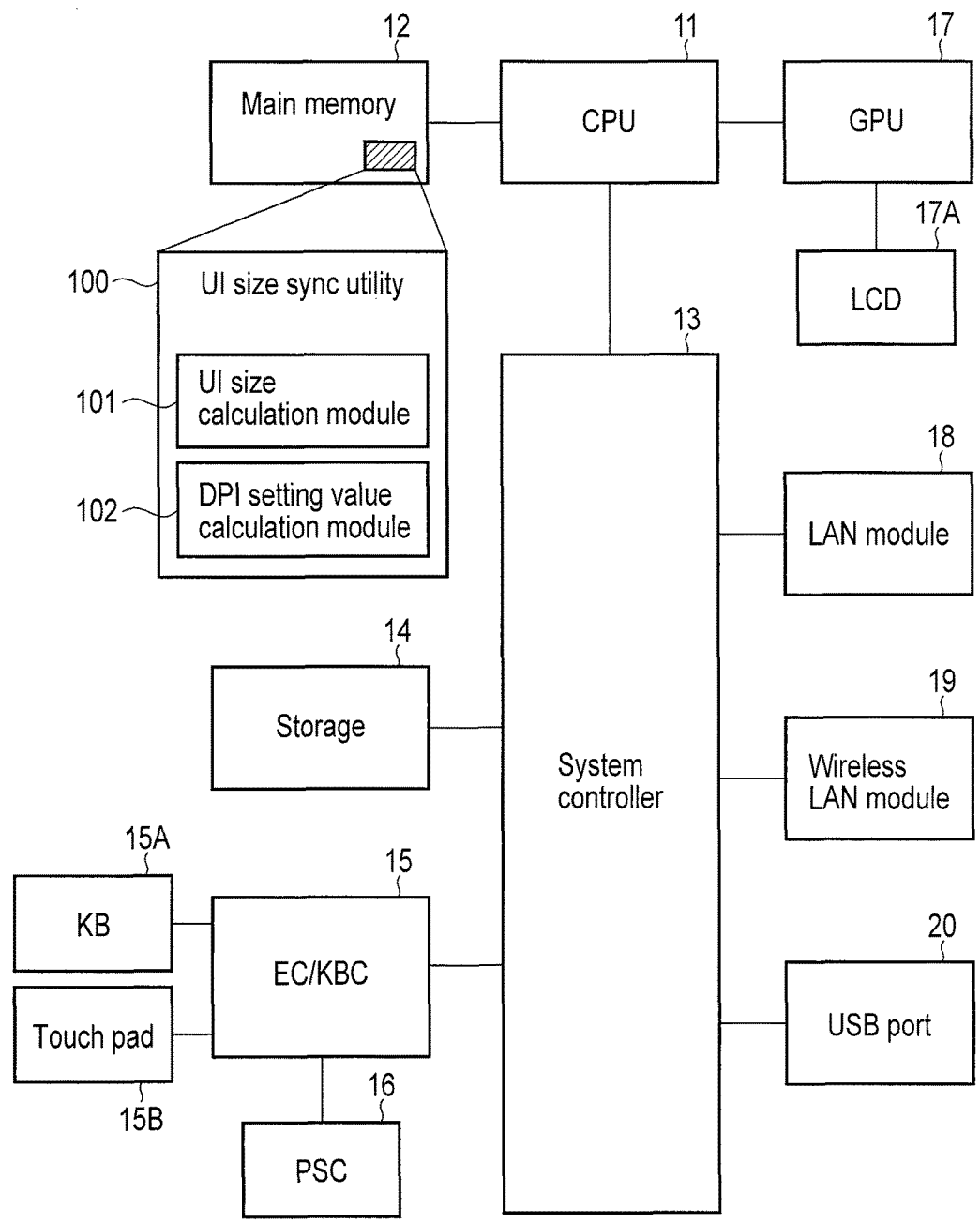
FIG. 2 is an exemplary diagram showing a system configuration of the electronic apparatus according to the embodiment.

FIG. 2 is an exemplary diagram showing a system configuration of the electronic apparatus 1 according to the present embodiment.

As shown in FIG. 2, the electronic apparatus 1 includes a CPU 11, a main memory 12, a system controller 13, a storage 14, an embedded controller/keyboard controller (EC/KBC) 15, a keyboard 15A, a touchpad 15B, a power supply controller (PSC) 16, a graphics processing unit (GPU) 17, a liquid crystal display (LCD) 17A, a LAN module 18, a wireless LAN module 19, a USB port 20, and such like.

The CPU 11 is a processor which controls an operation of each of the components of the electronic apparatus 1. The CPU 11 loads various types of software from the storage 14 into the main memory 12 and executes the software. The software includes an operating system (OS) and a UI size sync utility program 100 to be described later. The DPI setting is implemented by the OS. The UI size sync utility program 100 includes a UI size calculation module 101 and a DPI setting calculation module 102.

The system controller 13 is a bridge device which makes a connection between CPU 11 and each of the components. A serial ATA controller for controlling the storage 14 is built in the system controller 13.

The EC/KBC 15 is a power supply management controller for executing power supply management of the electronic apparatus 1 and is implemented as, for example, a single-chip microcomputer incorporating a keyboard controller for controlling the keyboard 15A and the touchpad 15B. The EC/KBC 15 includes a function to power the electronic apparatus 1 on and off in accordance with the user's operation of a power supply switch. Control of the powering the electronic apparatus 1 on and off is achieved by cooperative operation of the EC/KBC 15 and the PSC 16.

The GPU 17 is a display controller which controls the LCD 17A. The LAN module 18 is a communication module configured to execute communication over, for example, an ETHERNET® network. The wireless LAN controller 19 is a wireless communication module configured to execute communication over, for example, a WI-FI® network. The USB port 20 is a connector module which a USB device such as a USB memory can be attached to and detached from.

The transfer of the UI size via the cloud 2 or the direct transfer of the UI size between the parties can be executed by the LAN module 18 or the wireless LAN controller 19, and the transfer of the UI size can be executed via a storage medium by the USB port 20.

The UI size sync utility program 100 is a program which realizes a function to synchronize the display sizes of objects on the screens, and is installed on both of the electronic apparatus 1A and the electronic apparatus 1B shown in FIG. 1.

As described above, the electronic apparatus 1A, which the user already has possessed, calculates the UI size and the electronic apparatus 1B, which the user has newly purchased, calculates the DPI setting value in the own apparatus by using the UI size. The UI size calculation module 101 is a module which calculates the UI size, and the DPI setting value calculation module 102 is a module which calculates the DPI setting value.

First, a principle of calculating the UI size by the UI size calculation module 101 will be described by taking the UI size calculation module 101 in the UI size sync utility program 100 which runs on the electronic apparatus 1A as an example.

As described above, the LCD provided on the electronic apparatus 1A has the screen size of 13 inches and the resolution of 1366 pixels×768 pixels (HD [high definition]). The DPI setting of the electronic apparatus 1A is 125%. At this time, the UI size calculation module 101 calculates the UI size based on the above values by formula (1):

$$UI\ size = \frac{\sqrt{1366^2 + 768^2}}{13} \div 125\% = 0.9643 \qquad \text{formula (1)}$$

(pixels per inch-percent, abbreviated hereafter)

After calculating the UI size by the UI size calculation module 101, the UI size sync utility program 100 which runs on the electronic apparatus 1A updates the value to, for example, the cloud 2. At this time, 0.9643 is calculated as the UI size.

Next, a principle of calculating the DPI setting value by the DPI setting value calculation module 102 will be described by taking the DPI setting value calculation module 102 in the UI size sync utility program 100 which runs on the electronic apparatus 1B as an example.

First, the UI size sync utility program 100 which runs on the electronic apparatus 1B downloads the UI size from, for example, the cloud 2. The UI size to be downloaded is 0.9643 calculated by the UI size calculation module 101 of the UI size sync utility program 100 which runs on the electronic apparatus 1A. As described above, the LCD provided on the electronic apparatus 1B has the screen size of 17 inches and the resolution of 1920 pixels×1080 pixels (FHD [full high definition]). At this time, in accordance with the above values, the DPI setting value calculation module 102 calculates the DPI setting value by formula (2):

$$DPI\ setting\ value = \frac{\sqrt{1920^2 + 1080^2}}{17} \div 0.9643 = 134\% \qquad \text{formula (2)}$$

After calculating the DPI setting value by the DPI setting value calculation module 102, the UI size sync utility program 100 which runs on the electronic apparatus 1B executes the DPI setting for the own apparatus by using the value. At this time, 134% is calculated as the DPI setting value.

That is, the user can synchronize the sizes of objects such as characters and icons (a2 in FIG. 1) displayed on the electronic apparatus 1B, which the user has newly purchased, with the sizes of objects such as characters and icons (a1 in FIG. 1) displayed on the electronic apparatus 1A, which the user already has possessed, without finding the DPI setting value (134%) by trial and error.

For example, during the use of the electronic apparatus 1B, when the sizes of objects such as characters and icons displayed on the electronic apparatus 1B are changed by the DPI setting and when the adjusted sizes of objects needs to be reflected in the electronic apparatus 1A, the electronic apparatus 1B may calculate the UI size, and the electronic apparatus 1A may calculate the DPI setting value for the own apparatus by using the UI size. In addition, since a value smaller than 100% cannot be used as the DPI setting value on some operating systems, the UI size sync utility program 100 sets 100% as the DPI setting value and executes the DPI setting if the DPI setting value calculated by the DPI setting calculation module 102 is smaller than 100%.

According to the present embodiment, the sizes of the displayed objects such as characters and icons can be thus synchronized by simple operations even if the electronic apparatus 1A and the electronic apparatus 1B are different in screen size and resolution.

FIG. 3 is an exemplary flowchart showing procedures of synchronizing the display sizes of objects on the screens of the electronic apparatuses 1A and 1B according to the present embodiment.

On the electronic apparatus 1A, if the sizes of the displayed objects such as characters and icons are adjusted by the DPI setting (block A1), the UI size is calculated based on the DPI setting value and the screen size and the resolution of the LCD on the electronic apparatus 1A (block A2). The calculated UI size is output in order to be uploaded from the electronic apparatus 1A to, for example, the cloud 2 (block A3).

In contrast, on the electronic apparatus 1B, first, the UI size is acquired by downloading from, for example, the cloud 2 (block A4). Next, on the electronic apparatus 1B, the DPI setting value for the own apparatus is calculated based on the UI size and the screen size and the resolution of the LCD (block A5). Finally, the electronic apparatus 1B executes the DPI setting by using the DPI setting value (block A6).

It should be noted that the example of calculating the UI size and the DPI setting value by the UI size calculation module 101 and the DPI setting value calculation module 102 of the UI size sync utility program 100 which runs on the electronic apparatus 1 has been described, but the cloud 2 may include a function to calculate these values. More specifically, the electronic apparatus 1A transmits the DPI setting value for the own apparatus and the screen size and resolution of the LCD to the cloud 2, and the UI size is calculated in the cloud 2 based on these values. The electronic apparatus 1B transmits the screen size and resolution of the LCD to the cloud 2, and the DPI setting value on the electronic apparatus 1B is calculated in the cloud 2 based on these values and the calculated UI size. The value is returned from the cloud 2 to the electronic apparatus 1B and the DPI setting based on the value is executed on the electronic apparatus 1B. That is, a function to synchronize the sizes of objects on the screens of the electronic apparatuses 1A and 1B may be provided as a service of the cloud 2.

Since each process of the present embodiment can be implemented by a computer program, the same advantage as the present embodiment can be easily achieved by installing the computer program on a general computer through a computer-readable storage medium, which stores the computer program, and executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A system comprising a first electronic apparatus and a second electronic apparatus, the first electronic apparatus comprising:
a first display having a first screen size and a first resolution;
a first communication device; and
a first hardware processor configured to:
calculate a parameter value based on the first screen size, the first resolution and a first setting value associated with a display size of an object on the first display; and
transfer the parameter value to the second electronic apparatus by the first communication device, the second electronic apparatus comprising:
a second display having a second screen size and a second resolution, the second screen size and the second resolution being different from the first screen size and the first resolution;
a second communication device; and
a second hardware processor configured to:
receive the parameter value from the first electronic apparatus by the second communication device;
calculate a second setting value associated with a display size of the object on the second display by dividing a first number, which is obtained by dividing a square root of a second number obtained by adding a square of number of pixels in a horizontal direction on the second display and a square of number of pixels in a vertical direction on the second display by the screen size of the second display, by the parameter value; and
execute a setting of the second setting value.

2. The system of claim 1, wherein the first hardware processor of the first electronic apparatus is configured to calculate the parameter value by dividing a third number, which is obtained by dividing a square root of a fourth number obtained by adding a square of number of pixels in a horizontal direction on the first display and a square of number of pixels in a vertical direction on the first display by the screen size of the first display, by the first setting value.

3. The system of claim 1, wherein the second hardware processor of the second electronic apparatus is configured to execute the setting by using a first value, when the calculated second setting value is smaller than the first value.

4. The system of claim 1, wherein the first hardware processor of the first electronic apparatus is configured to upload the parameter value to a server connected via a network in order to transfer the parameter value to the second electronic apparatus by the first communication device.

5. The system of claim 1, wherein the second hardware processor of the second electronic apparatus is configured to download the parameter value from a server connected via a network in order to receive the parameter value from the first electronic apparatus by the second communication device.

6. The system of claim 1, wherein the first electronic apparatus further comprises a first connector, and the first hardware processor of the first electronic apparatus is configured to transfer the parameter value to the second electronic apparatus via the first connector.

7. The system of claim 1, wherein the second electronic apparatus further comprises a second connector, and the second hardware processor of the second electronic apparatus is configured to receive the parameter value from the first electronic apparatus via the second connector.

8. A configuration setting method for synchronizing a display size of an object on a first display of a first electronic apparatus with a display size of the object on a second display of a second electronic apparatus, the first display having a first screen size and a first resolution, the second display having a second screen size and a second resolution, the second screen size and the second resolution being different from the first screen size and the first resolution, the method comprising:

calculating, by the first electronic apparatus, a parameter value based on the first screen size, the first resolution and a first setting value associated with the display size of the object on the first display;

transferring, by the first electronic apparatus, the parameter value to the second electronic apparatus;

receiving, by the second electronic apparatus, the parameter value from the first electronic apparatus;

calculating, by the second electronic apparatus, a second setting value associated with the display size of the object on the second display by dividing a first number, which is obtained by dividing a square root of a second number obtained by adding a square of number of pixels in a horizontal direction on the second display and a square of number of pixels in a vertical direction on the second display the screen size of the second display, by the parameter value; and executing, by the second electronic apparatus, a setting of the second setting value.

\* \* \* \* \*